(12) United States Patent
Brown et al.

(10) Patent No.: US 6,795,878 B2
(45) Date of Patent: Sep. 21, 2004

(54) VERIFYING CUMULATIVE ORDERING OF MEMORY INSTRUCTIONS

(75) Inventors: Aaron Ches Brown, Austin, TX (US); Steven Robert Farago, Austin, TX (US); Robert James Ramirez, Chicago, IL (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 09/734,115

(22) Filed: Dec. 11, 2000

(65) Prior Publication Data

US 2002/0112122 A1 Aug. 15, 2002

(51) Int. Cl.[7] ............................................... G06F 13/37
(52) U.S. Cl. ........................... 710/43; 710/39; 710/40; 710/125; 711/151; 711/158
(58) Field of Search .......................... 710/56, 107, 39, 710/40, 41, 42, 43, 112, 115, 116, 125, 244; 711/154, 151, 158

(56) References Cited

U.S. PATENT DOCUMENTS

| | | | | |
|---|---|---|---|---|
| 551,005 | A | * 12/1895 | Sarangdhar | 711/145 |
| 5,182,808 | A | * 1/1993 | Bagnoli et al. | 710/119 |
| 5,226,126 | A | * 7/1993 | McFarland et al. | 712/218 |
| 5,404,464 | A | * 4/1995 | Bennett | 710/306 |
| 5,420,991 | A | * 5/1995 | Konigsfeld et al. | 711/150 |
| 5,504,900 | A | * 4/1996 | Raz | 707/10 |
| 5,546,554 | A | * 8/1996 | Yung et al. | 711/203 |
| 5,761,731 | A | * 6/1998 | Van Doren et al. | 711/155 |
| 5,802,569 | A | * 9/1998 | Genduso et al. | 711/137 |
| 5,900,020 | A | * 5/1999 | Safranek et al. | 711/167 |
| 5,961,629 | A | * 10/1999 | Nguyen et al. | 712/23 |
| 6,085,263 | A | 7/2000 | Sharma et al. | 710/56 |
| 6,088,771 | A | * 7/2000 | Steely et al. | 711/154 |
| 6,108,737 | A | 8/2000 | Sharma et al. | 710/107 |

* cited by examiner

Primary Examiner—B. James Peikari
(74) Attorney, Agent, or Firm—Robert A. Voigt, Jr.; Winstead Sechrest & Minick P.C.; Casimer K. Salys

(57) ABSTRACT

A method, computer program product and data processing system for verifying cumulative ordering. In one embodiment of the present invention a method comprises the step of selecting a memory barrier instruction issued by a particular processor. The method further comprises selecting a first cache line out of a plurality of cache lines to be paired with one or more of the remaining of the plurality of cache lines. If a load memory instruction executed after the memory barrier instruction in the first cache line was identified, then the first cache line selected will be paired with a second cache line. If a load memory instruction executed before the memory barrier instruction in the second cache line was identified, then a pair of load memory instructions has been identified. Upon identifying the second load memory instruction, a first and second reload of the first and second cache lines are identified. Upon identifying the first and second reloads of the first and second cache lines, a determination may be made as to whether the first reload occurred after the second. If the first reload did not occur after the second reload, then a determination may be made as to whether the ownership transaction referencing the first cache line was initiated between the first and second reload. If the ownership transaction was initiated between the first and second reload, then a potential violation of cumulative ordering has been identified.

63 Claims, 5 Drawing Sheets

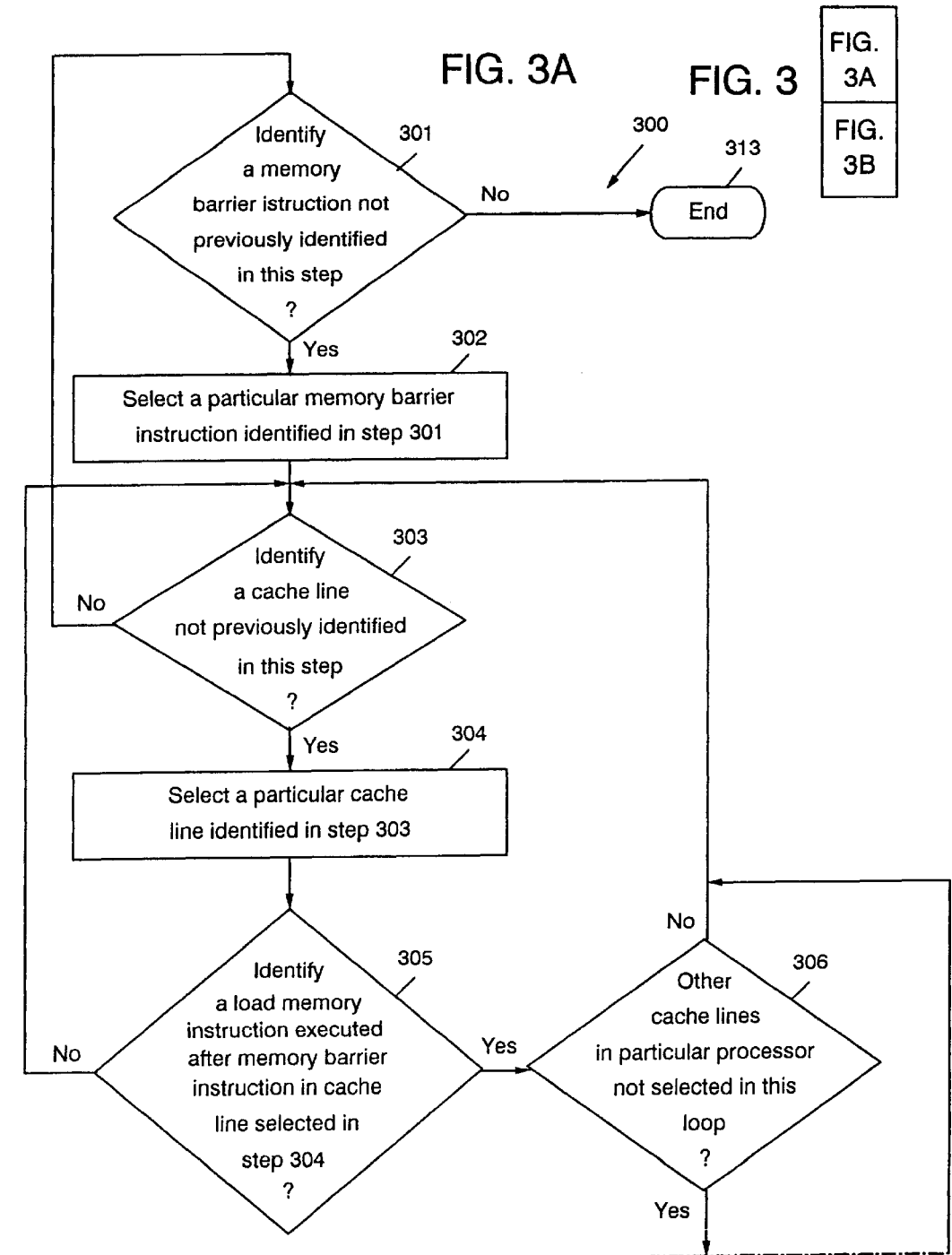

230

L1, A
L2, B
L3, C
L4, B
L5, A
L6, A
L7, C
MB1
L8, A
L9, C
L10, C
L11, B
L12, B
L13, A
L14, A
L15, C
MB2
L16, B
L17, A
L18, B
L19, C
L20, A

VERIFYING CUMULATIVE ORDERING OF MEMORY INSTRUCTIONS

TECHNICAL FIELD

The present invention relates to the field of multiprocessing systems, and more particularly to a program that verifies cumulative ordering of memory instructions.

BACKGROUND INFORMATION

A multiprocessor data processing system may include a plurality of processors and a shared main memory, where each processor includes its own cache comprising a plurality of cache lines. Each of the plurality of processors may be synchronized, commonly referred to as interprocessor synchronization, in a shared memory system so that memory instructions in different cache lines maintain an order.

For example, in Table 1 below, one of the processors in the multiprocessor system, e.g., P1, may update data values and subsequently set a flag variable to indicate to another processor in the multiprocessor system, e.g., P2, that the data value has been updated. Processor P2 may check the value of the flag variable and, if set, subsequently issues read operations to load the new data values. If processor P1 sets the flag before it updated the data or if processor P2 retrieves the data prior to checking the value of the flag, synchronization is not achieved.

TABLE 1

| P1 | | P2 | |
|---|---|---|---|
| Store | Data 1, New Value 1 | Load | Flag |
| Store | Flag, 0 | Load | Data 1 |

Synchronization may be maintained through a special memory instruction commonly referred to as a memory barrier instruction which is issued by processors in the multiprocessor system. A memory barrier instruction, MB, indicates that all memory instructions prior to MB, i.e., pre-MB instructions, are ordered before all memory instructions after the MB, i.e., post-MB instructions. However, no order is required between memory instructions that are not separated by a MB instruction. For example, in Table 2 below,

TABLE 2

| P1 | | | P2 | |
|---|---|---|---|---|
| Store 1 | Data 1, New Value 1 | Memory Address 1 | Load 1 | Flag |
| Store 2 | Data 2, New Value 2 | Memory Address 2 | MB | |
| MB | | | Load 2 | Data 1 |
| Store 3 | Flag, 0 | Memory Address 3 | Load 3 | Data 2 | memory instructions may instruct the processor to store data at different memory addresses which may be different cache lines in the particular processor. Store memory instructions 1 and 2 may be executed by processor P1 to store data 1 and data 2, respectively, at memory address 1 and 2, respectively. Store memory instruction 3 may be executed by processor P1 to store the value of the flag variable at memory address 3. Since processor P1 had issued a memory barrier instruction, processor P1 must execute store memory instructions 1 and 2 prior to the execution of store memory instruction 3, which is commonly referred to as strong ordering, though store memory instructions 1 and 2 may be executed in either order which is commonly referred to as weak ordering. That is, weak ordering refers to memory instructions that may be executed in either order since they do not reference the same cache line. Strong ordering refers to memory instructions that must be executed in order since they reference the same cache line. Processor P2 may then execute load memory instruction 1 to load the value of the flag variable from memory address 3. Processor P2 may then execute load memory instructions 2 and 3 to load data 1 and data 2 from memory address 1 and 2, respectively. Since processor P2 had issued a memory barrier instruction, processor P2 must execute load memory instruction 1 prior to the execution of load memory instructions 2 and 3 though load memory instructions 1 and 2 may be executed in either order because they do not reference the same cache line. When processor P2 executes load memory instruction 1, processor P2 must be able to identify the data values at memory address 1 and 2 in subsequent loads after the memory barrier instruction. This is commonly referred to as cumulative ordering.

A prior art technique in verifying cumulative ordering includes identifying all pairs of storage accesses, e.g., store memory instructions 1–3, on each side of the memory barrier. For example, store memory instruction 3 is paired with both store memory instruction 1 and store memory instruction 2. The data stored in the storage accesses that are executed after the memory barrier instruction, e.g., store memory instruction 3, will later be loaded by a different device, e.g., processor P2. Upon loading that data, the prior art technique verifies that the data read by one processor, e.g., processor P2, from executing a load memory instruction, e.g., load memory instruction 1, before the memory barrier instruction issued by that processor, e.g., processor P2, is the same data that was stored by another processor, e.g., processor P1, from executing a store memory instruction, e.g., store memory instruction 3, after the memory barrier instruction issued by that processor, e.g., processor P1. A further verification is made by comparing the data read by one processor, e.g., processor P2, from executing a load memory instruction, e.g., load memory instruction 2, after the memory barrier instruction issued by that processor, e.g., processor P2, is the same data that was stored by another processor, e.g., processor P1, from executing a store memory instruction, e.g., store memory instruction 1, before the memory barrier instruction issued by that processor, e.g., processor P1. Unfortunately, the prior art technique is very inefficient in that it must make pair-wise comparisons of all loads and stores on each side of each memory barrier instruction.

It would therefore be desirable to verify cumulative ordering without verifying that the data read from executing load memory instructions before/after the memory barrier instruction by one device is the same data that was stored after/before the memory barrier instruction by another device.

SUMMARY

The problems outlined above may at least in part be solved in some embodiments by first selecting a memory barrier instruction issued by a particular processor. A first cache line out of a plurality of cache lines may then be selected to be paired with one or more of the remaining of the plurality of cache lines. If a load memory instruction executed after the memory barrier instruction in the first cache line was identified, then the first cache line selected will be paired with a second cache line. If a load memory instruction executed before the memory barrier instruction in the second cache line was identified, then a pair of load memory instructions has been identified. The pair of load memory instructions comprises the first load memory instruction executed after the memory barrier instruction in the first cache line and the second load memory instruction executed before the memory barrier instruction in the second cache line. Upon identifying the second load memory instruction, a first and second reload of the first and second cache lines are identified. A reload may be a system bus transaction that causes a cache line of a particular cache of a particular processor to be updated. Upon identifying the first and second reloads of the first and second cache lines, a determination may be made as to whether the first reload occurred after the second. If the first reload did not occur after the second reload, then a determination may be made as to whether the ownership transaction referencing the first cache line was initiated between the first and second reload. The ownership transaction may refer to a processor procuring control of a cache line to write data to that particular cache line upon obtaining permission from other devices, e.g., processors, in a multiprocessor data processing system. If the ownership transaction was initiated between the first and second reload, then a potential violation of cumulative ordering has been identified.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIGS. 3A and 3B are a flowchart of a method for verifying cumulative ordering.

DETAILED DESCRIPTION

The present invention comprises a method, computer program product and data processing system for verifying cumulative ordering. In one embodiment of the present invention a method comprises the step of selecting a memory barrier instruction issued by a particular processor. The method further comprises selecting a first cache line out of a plurality of cache lines to be paired with one or more of the remaining of the plurality of cache lines. If a load memory instruction executed after the memory barrier instruction in the first cache line was identified, then the first cache line selected will be paired with a second cache line. If a load memory instruction executed before the memory barrier instruction in the second cache line was identified, then a pair of load memory instructions has been identified. The pair of load memory instructions comprises the first load memory instruction executed after the memory barrier instruction in the first cache line and the second load memory instruction executed before the memory barrier instruction in the second cache line. Upon identifying the second load memory instruction, a first and second reload of the first and second cache lines are identified. A reload may be a system bus transaction that causes a cache line of a particular cache of a particular processor to be updated. Upon identifying the first and second reloads of the first and second cache lines, a determination may be made as to whether the first reload occurred after the second. If the first reload occurred after the second reload, then a determination is made as to whether there are other remaining cache lines that have not paired with the first cache line. If the first reload did not occur after the second reload, then a determination may be made as to whether the ownership transaction referencing the first cache line was initiated between the first and second reload. The ownership transaction may refer to a processor procuring control of a cache line to write data to that particular cache line upon obtaining permission from other devices, e.g., processors, in a multiprocessor data processing system. If the ownership transaction was initiated between the first and second reload, then a potential violation of cumulative ordering has been identified.

Figure 1:
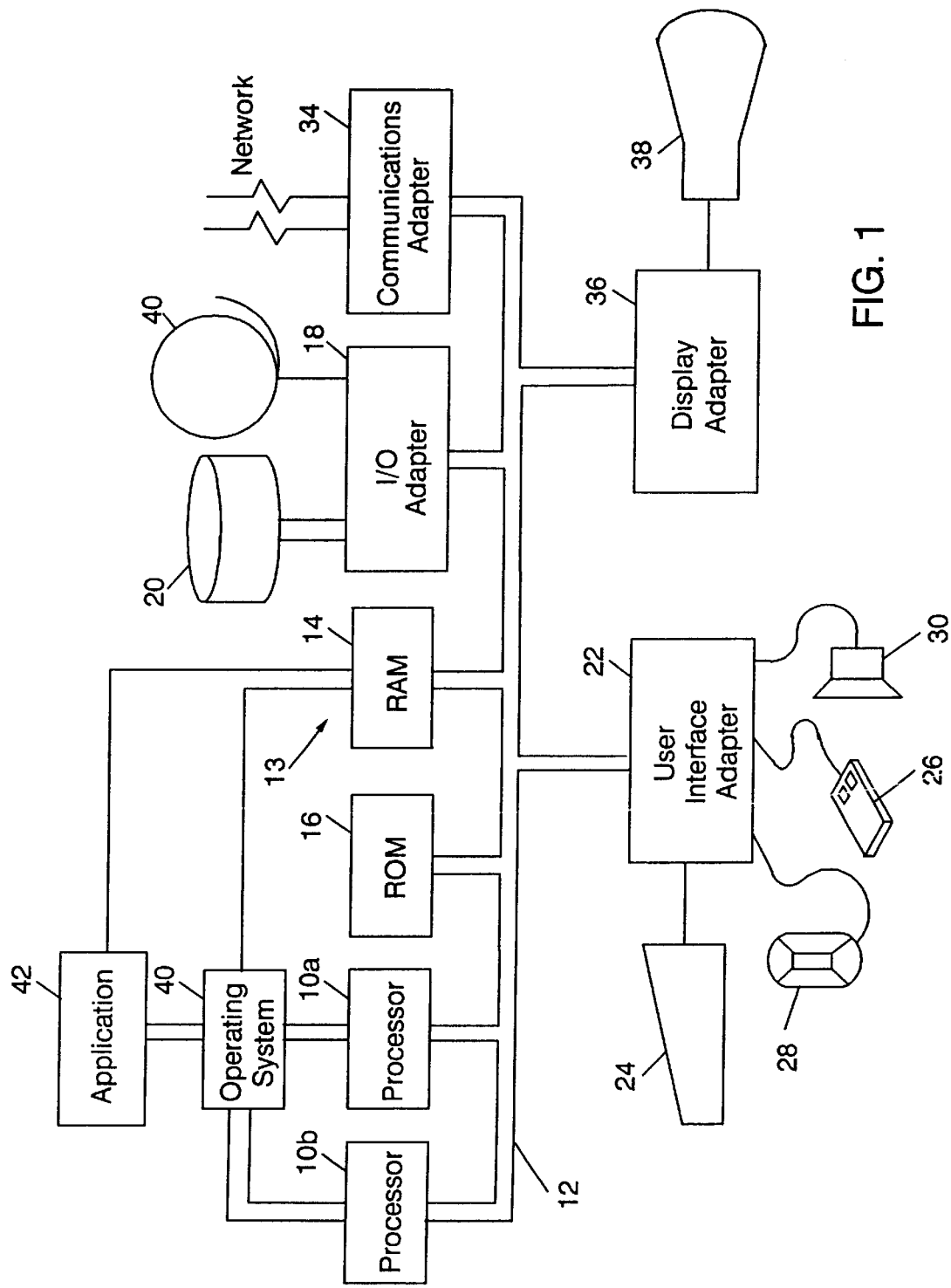
FIG. 1 illustrates a multiprocessor data processing system configured in accordance with the present invention.

FIG. 1—Multiprocessor Data Processing System

FIG. 1 illustrates a typical hardware configuration of multiprocessor data processing system 13 which is representative of a hardware environment for practicing the present invention. Data processing system 13 has a processor 10a and a processor 10b for processing information according to the preferred embodiment. Processors 10a and 10b are coupled to various other components by system bus 12. An operating system 40, e.g., DOS, OS/2™, may run on processors 10a and 10b and provide control and coordinate the function of the various components of FIG. 1. An application 42 may run in conjunction with operating system 40 and provide output calls to operating system 40 which implements the various functions to be performed by the application 42. Read only memory (ROM) 16 is coupled to system bus 12 and includes a basic input/output system ("BIOS") that controls certain basic functions of data processing system 13. Random access memory (RAM) 14, I/O adapter 18, and communications adapter 34 are also coupled to system bus 12. It should be noted that software components including operating system 40 and application 42 are loaded into RAM 14 which is the computer system's main memory. I/O adapter 18 may be a small computer system interface ("SCSI") adapter that communicates with disk units 20, e.g., disk drive, and tape drives 40. It is noted that the program of the present invention that verifies cumulative ordering may be implemented as part of the verification program as described in FIG. 2 where the verification program resides in disk unit 20 or application 42. It is further noted that the program of the present invention may reside independently of the verification program in application 42 or disk unit 20. Communications adapter 34 interconnects bus 12 with an outside network enabling data processing system 13 to communication with other such systems. Input/Output devices are also connected to system bus 12 via a user interface adapter 22 and a display adapter 36. Keyboard 24, trackball 28, mouse 26 and speaker 30 are all interconnected to bus 12 through user interface adapter 22. A display monitor 38 is connected to system bus 12 by display adapter 36. In this manner, a user is capable of inputting to system 13 through keyboard 24, trackball 28 or mouse 26 and receiving output from system 13 via display 38 or speaker 30.

Preferred implementations of the invention include implementations as a multiprocessor system programmed to execute the method or methods described herein, and as a computer program product. According to the multiprocessor system implementations, sets of instructions for executing the method or methods are resident in the random access memory 14 of one or more multiprocessor systems configured generally as described above. Until required by the multiprocessor system, the set of instructions may be stored as a computer program product in another computer memory, for example, in disk drive 20 (which may include a removable memory such as an optical disk or floppy disk for eventual use in disk drive 20). Furthermore, the computer program product can also be stored at another multiprocessor system and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 2:
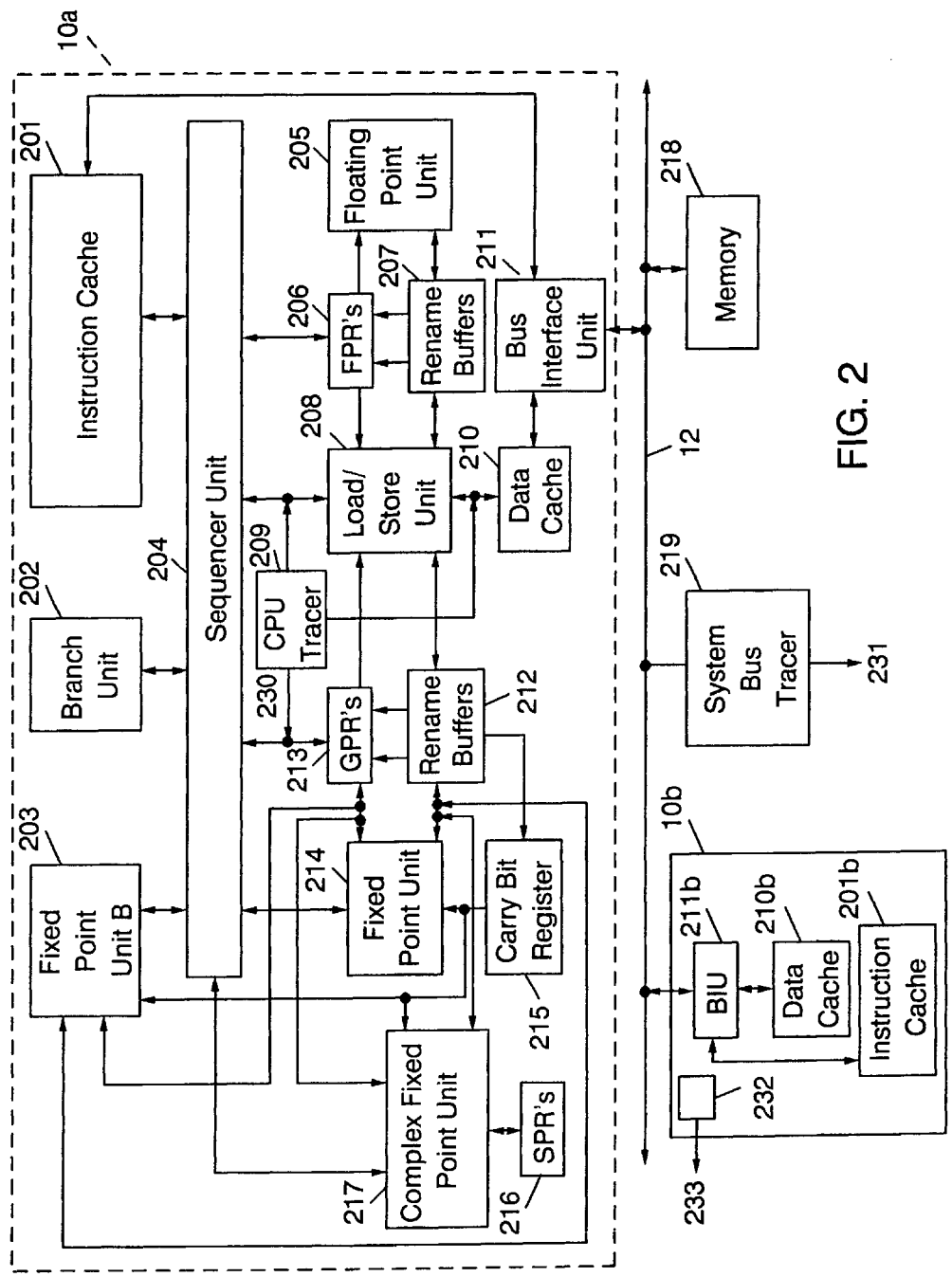
FIG. 2 illustrates an embodiment of the multiprocessors in the multiprocessor data processing system configured in accordance with the present invention.

FIG. 2—Embodiment of Multiprocessors

FIG. 2 illustrates an embodiment of the present invention of processors 10a and 10b. Processor 10a and processor 10b may be similar to each other and include like elements. In the preferred embodiment, processor 10a is a single integrated circuit superscalar microprocessor. Accordingly, as discussed further herein below, processor 10a includes various units, registers, buffers, memories, and other sections, all of which are formed by integrated circuitry. Also, in the preferred embodiment, processor 10a operates according to reduced instruction set computer ("RISC") techniques. As shown in FIG. 2, a system bus 12 is connected to a bus interface unit ("BIU") 211 of processor 10a. BIU 211 controls the transfer of information between processor 10a and system bus BIU 211 is connected to an instruction cache 201 and to a data cache 210 of processor 10a. Data cache 210 comprises a plurality of cache lines. Instruction cache 201 outputs instructions to a sequencer unit 204. In response to such instructions from instruction cache 201, sequencer unit 204 selectively outputs instructions to other execution circuitry of processor 10a.

In addition to sequencer unit 204, in the preferred embodiment the execution circuitry of processor 10a includes multiple execution units, namely a branch unit 202, a fixed point unit A ("FXUA") 214, a fixed point unit B ("FXUB") 203, a complex fixed point unit ("CFXU") 217, a load/store unit ("LSU") 208, and a floating point unit ("FPU") 205. FXUA 214, FXUB 203, CFXU 217, and LSU 208 input their source operand information from general purpose architectural registers ("GPR's") 213 and fixed point rename buffers 212. Moreover, FXUA 214 and FXUB 203 input a "carry bit" from a carry bit ("CA") register 215. FXUA 214, FXUB 203, CFXU 217, and LSU 208 output results (destination operand information) of their operations for storage at selected entries in fixed point rename buffers 212. Also, CFXU 217 inputs and outputs source operand information and destination operand information to and from special purpose registers ("SPRs") 216.

FPU 205 inputs its source operand information from floating point architectural registers ("FPRs") 206 and floating point rename buffers 207. FPU 205 outputs results (destination operand information) of its operation for storage at selected entries in floating point rename buffers 207.

In response to a load instruction, LSU 208 inputs information from data cache 210 and copies such information to selected ones of rename buffers 212 and 207. If such information is not stored in data cache 210, then data cache 210 inputs (through BIU 211 and system bus 11) such information from a system memory 218 connected to system bus 12. Moreover, data cache 210 is able to output (through BIU 211 and system bus 12) information from data cache 210 to system memory 218 connected to system bus 12. In response to a store instruction, LSU 208 inputs information from a selected one of GPRs 213 and FPRs 206 and copies such information to data cache 210.

Sequencer unit 204 inputs and outputs information to and from GPRs 213 and FPRs 206. From sequencer unit 204, branch unit 202 inputs instructions and signals indicating a present state of processor 10a. In response to such instructions and signals, branch unit 202 outputs (to sequencer unit 204) signals indicating suitable memory addresses containing a sequence of instructions for execution by processor 10a. In response to such signals from branch unit 202, sequencer unit 204 inputs the indicated sequence of instructions from instruction cache 201. If one or more of the sequence of instructions is not stored in instruction cache 201, then instruction cache 201 inputs (through BIU 211 and system bus 12) such instructions from system memory 218 connected to system bus 12.

In response to the instructions input from instruction cache 201, sequencer unit 204 selectively dispatches the instructions to selected ones of execution units 202, 214, 203, 217, 208, and 205. Each execution unit executes one or more instructions of a particular class of instructions. For example, FXUA 214 and FXUB 203 execute a first class of fixed point mathematical and logical operations on source operands, such as addition, subtraction, ANDing, ORing and XORing. CFXU 217 executes a second class of fixed point operations on source operands, such as fixed point multiplication and division. FPU 205 executes floating point operations on source operands, such as floating point multiplication and division.

As information is stored at a selected one of rename buffers 212, such information is associated with a storage location (e.g. one of GPRs 213 or CA register 215) as specified by the instruction for which the selected rename buffer is allocated. Information stored at a selected one of rename buffers 212 is copied to its associated one of GPRs 213 (or CA register 215) in response to signals from sequencer unit 204. Sequencer unit 204 directs such copying of information stored at a selected one of rename buffers 212 in response to "completing" the instruction that generated the information. Such copying may be referred to as "writeback".

As information is stored at a selected one of rename buffers 207, such information is associated with one of FPRs 206. Information stored at a selected one of rename buffers 207 is copied to its associated one of FPRs 206 in response to signals from sequencer unit 204. Sequencer unit 204 directs such copying of information stored at a selected one of rename buffers 207 in response to "completing" the instruction that generated the information.

Processor 10a achieves high performance by processing multiple instructions simultaneously at various ones of execution units 202, 214, 203, 217, 208, and 205. Accordingly, each instruction is processed as a sequence of stages, each being executable in parallel with stages of other instructions. Such a technique is called "pipelining". In a significant aspect of the illustrative embodiment, an instruction is normally processed as six stages, namely fetch, decode, dispatch, execute, completion, and writeback.

In the fetch stage, sequencer unit 204 selectively inputs (from instructions cache 201) one or more instructions from one or more memory addresses storing the sequence of instructions previously discussed hereinabove in connection with branch unit 202, and sequencer unit 204.

In the decode stage, sequencer unit 204 decodes up to four fetched instructions.

In the dispatch stage, sequencer unit 204 selectively dispatches up to four decoded instructions to selected (in response to the decoding in the decode stage) ones of execution units 202, 214, 203, 217, 208, and 205 after reserving rename buffer entries for the dispatched instructions results (destination operand information). In the dispatch stage, operand information is supplied to the selected execution units for dispatched instructions. Processor 10a dispatches instructions in order of their programmed sequence.

In the execute stage, execution units execute their dispatched instructions and output results (destination operand information) of their operations for storage at selected entries in rename buffers 212 and rename buffers 207 as previously discussed hereinabove. In this manner, processor 10a is able to execute instructions out-of-order relative to their programmed sequence.

In the completion stage, sequencer unit 204 indicates an instruction is "complete." Processor 10a "completes" instructions in order of their programmed sequence.

In the writeback stage, sequencer 204 directs the copying of information from rename buffers 212 and 207 to GPRs 213 and FPRs 206, respectively. Sequencer unit 204 directs such copying of information stored at a selected rename buffer. Likewise, in the writeback stage of a particular instruction, processor 10a updates its architectural states in response to the particular instruction. Processor 10a processes the respective "writeback" stages of instructions in order of their programmed sequence. Processor 10a advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 217) may require more than one cycle. Accordingly, a variable delay may occur between a particular instruction's execution and completion stages in response to the variation in time required for completion of preceding instructions.

In the preferred embodiment, processor 10b is connected to system bus 12 and shares main memory 218. Processor 10b is similar to processor 10a and includes elements similar to processor 10a. Processor 10b includes bus interface unit 211b, data cache 210b, and instruction cache 201b, as well as elements which perform similarly to the remaining elements shown in processor 10a.

In accordance with the principles of the present invention, all events occurring at a plurality of locations within multiprocessor system 13 may be monitored during execution of a verification program. These events may be stored in the order in which they occurred. For purposes of the following discussion, it will be assumed that the verification program is applied to multiprocessor system 13. However, those skilled in the art will recognize that the verification program may be applied to either multiprocessor system 13 or a simulator which simulates multiprocessor system 13.

The verification program is executed by multiprocessor system 13. During execution, events occurring at a plurality of locations are monitored to generate a plurality of traces. The traces obtained by monitoring events at a plurality of locations are stored and can be utilized to determine whether multiprocessor system 13 is operating properly.

For example, a system bus tracer 219 is utilized to monitor all events occurring on system bus 12. In this manner, system bus trace 231 is generated and includes all events occurring on system bus 12 during execution of the verification program in the order in which the events occurred. System bus trace 231 includes all reads and writes from all processors to and from main memory 218 as well as memory barrier instructions issued by all processors which occurred during the execution of the verification program in the particular order that they occurred.

CPU tracer 209 of processor 10a is utilized to generate a CPU trace 230. CPU tracer 232 of processor 10b is utilized to generate a CPU trace 233. A CPU trace includes events occurring at the particular CPU during execution of the verification program such as store and load memory instructions. In a preferred embodiment, for a particular CPU, the CPU trace will include an indication of each instruction which was issued, completed, and performed utilizing the particular CPU, as well as the order in which each instruction was issued, completed, and performed. From system bus trace 231 and CPU traces 230 and 233, a process of the present invention may be able to verify cumulative ordering as will be described in further detail in FIGS. 3A and 3B. In one embodiment, the process of the present invention may be implemented as part of the verification program where the verification program resides in application 42 or disk unit 20. In another embodiment, the process of the present invention may be performed by a program residing independently of the verification program in application 42 or disk unit 20.

An instruction is "issued" when it is dispatched by sequencer 204 to either the data cache 210 or memory 218 through load/store unit 208. An instruction is "completed" when it has executed and is at a stage where any exception will not cause the re-issuance of this instruction. For example, in a system utilizing precise interrupts, when an exception occurs, all completed instructions will be performed and all instructions that have been issued but not completed will be re-issued. A load instruction is "performed" when the value to be returned by a load can no longer be changed by a subsequent store to the same location by any processor. A store instruction is "performed" when any load from the same location written by the store returns the value currently stored.

Additional details regarding the verification program as described above are disclosed in U.S. Pat. No. 6,021,261, filed on Dec. 5, 1996, entitled "Method and System for Testing a Multiprocessor Data Processing System," Attorney Docket No. AT9-96-094, which is hereby incorporated by reference in its entirety.

Figure 3B:
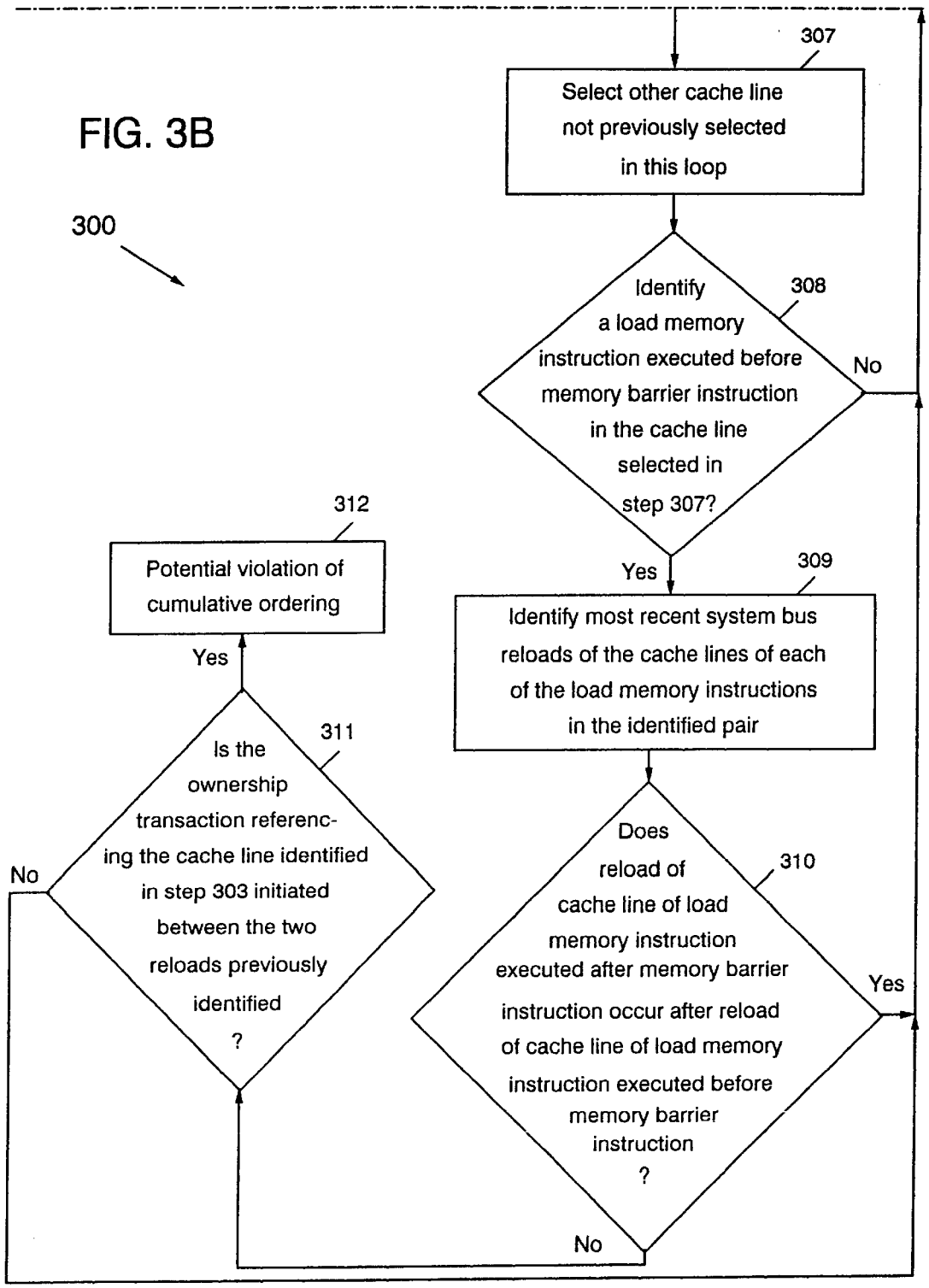

FIGS. 3A and 3B—Method for Verifying Cumulative Ordering

FIGS. 3A and 3B illustrates a flowchart of one embodiment of the present invention of a method 300 for verifying cumulative ordering in a particular processor, e.g., 10a, 10b, in a multiprocessor system 13. As stated in the Background Information section, synchronization between multiprocessors, e.g., 10a and 10b, may be maintained through the issuance of a memory barrier instruction. A memory barrier instruction, MB, indicates that all memory instructions prior to MB, i.e., pre-MB instructions, are ordered before all memory instructions after the MB, i.e., post-MB instructions. However, no order is required between memory instructions that are not separated by a MB instruction. For example, in Table 3 below,

TABLE 3

| | Processor 10a | | Processor 10b | |
| --- | --- | --- | --- | --- |
| Store 1 | Data 1, New Value 1 | Memory Address 1 | Load 1 | Flag |
| Store 2 | Data 2, New Value 2 | Memory Address 2 | MB | |
| MB | | | Load 2 | Data 1 |
| Store 3 | Flag, 0 | Memory Address 3 | Load 3 | Data 2 | memory instructions may instruct a processor, e.g., processor 10a, to store data at different memory addresses which may be different cache lines in the particular processor, e.g., processor 10a. Store memory instructions 1 and 2 may be executed by processor 10a to store data 1 and data 2 at memory addresses 1 and 2, respectively. Store memory instruction 3 may be executed by processor 10a to store the value of the flag variable at memory address 3. Since processor 10a had issued a memory barrier instruction, processor 10a must execute store memory instructions 1 and 2 prior to the execution of store memory instruction 3 though store memory instructions 1 and 2 may be executed in either order since they do not reference the same cache line. Processor 10b may then execute load memory instruction 1 to load the value of the flag variable from memory address 3. Processor 10b may then execute load memory instructions 2 and 3 to load data 1 and data 2 from memory address 1 and 2, respectively. Since processor 10b had issued a memory barrier instruction, processor 10b must execute load memory instruction 1 prior to the execution of load memory instructions 2 and 3 though memory instructions loads 1 and 2 may be executed in either order because they do not reference the same cache line. When processor 10b executes load memory instruction 1, processor 10b must be able to identify the data values at memory address 1 and 2 in subsequent loads after the memory barrier instruction. This is commonly referred to as cumulative ordering.

As further stated in the Background Information section, a prior art technique in verifying cumulate ordering is very inefficient in that it must make pair-wise comparisons of all loads and stores on each side of each memory barrier instruction. For example, a verification is made that the data read by one processor, e.g., processor 10b, from executing a load memory instruction, e.g., load memory instruction 1, before the memory barrier instruction issued by that processor, e.g., processor 10b, is the same data that was stored by another processor, e.g., processor 10a, from executing a store memory instruction, e.g., store memory instruction 3, after the memory barrier instruction issued by that processor, e.g., processor 10b. A further verification is made that the data read by one processor, e.g., processor 10b, from executing a load memory instruction, e.g., load memory instruction 2, after the memory barrier instruction issued by that processor, e.g., processor 10b, is the same data that was stored by another processor, e.g., processor 10a, from executing a store memory instruction, e.g., store memory instruction 1, before the memory barrier instruction issued by that processor, e.g., processor 10b. It would therefore be desirable to verify cumulative ordering without verifying that the data read from executing load memory instructions before/after the memory barrier instruction by one processor is the same data that was stored after/before the memory barrier instruction by another processor. Method 300 is a method 300 that verifies cumulative ordering in a particular processor, e.g., 10a, 10b, in a multiprocessor system 13 without separately verifying that the data loaded corresponds to the data stored.

In verifying cumulative ordering, method 300 includes certain assumptions which are discussed below. When a processor, e.g., processor 10b, executes a load instruction and the data to be loaded is not valid in the particular cache, then the processor, e.g., processor 10b, issues a read on the system bus which is traced by a system tracer, e.g., system bus tracer 219. A first assumption is that any subsequent load memory instructions executed by that processor, e.g., processor 10b, will not load data older than the data previously traced by system tracer 219. A second assumption is that the data read by a read issued by a processor, e.g., processor 10b, is the same data as that stored by the store memory instruction previously executed by another processor, e.g., processor 10a. A third assumption is that memory instructions that are strongly ordered as discussed in the Background Information section are separately verified. A fourth assumption is that if the processor, e.g., processor 10b, loads data consecutively from the same memory address, only one of those load memory instructions needs to be selected to be paired with another load memory instruction in verifying cumulative ordering, as will further be described below.

Figure 4:
FIG. 4 illustrates a CPU trace comprising a list of load memory instructions executed and memory barrier instructions issued.

Referring to FIGS. 3A and 3B, steps 301–308 will be discussed in conjunction with FIG. 4. FIG. 4 illustrates a CPU trace, e.g., CPU trace 230, that comprises a listing of events traced, e.g., load memory instructions executed and memory barrier instructions issued. Furthermore, the appropriate cache line of a particular data cache, e.g., data cache 210b, where the data to be loaded was stored is identified by the letters A, B and C which symbolizes three different cache lines in the particular data cache, e.g., data cache 210b, of a particular processor, e.g., processor 10b. It is noted that data cache, e.g., data cache 210b, may comprise any number of cache lines. It is further noted that any number of load memory instructions may be executed and any number of memory barrier instructions issued by a processor, e.g., processor 10b, and that FIG. 4 is used for illustrative purposes. In step 301, a determination is made as to whether the program identified a memory barrier instruction issued by a particular processor not previously identified in step 301. That is, the program identifies a particular memory baffler instruction out of the total number of memory baffler instructions issued by a particular processor, e.g., processor 10b, that the program has not previously identified in step 301. If the program has identified a memory baffler instruction not previously identified in step 301, then the program in step 302 selects a particular memory baffler instruction, e.g., MB1, that was issued by a particular processor, e.g., processor 10b, that was identified in step 301.

In step 303, a determination is made as to whether the program has identified a cache line not previously identified in step 303. If the program has not identified a cache line not previously identified in step 303, then a determination is made as to whether the program identified a memory barrier instruction issued by a particular processor not previously identified in step 301. If the program has identified a cache line not previously identified in step 303, then the program in step 304 selects a particular cache line out of the plurality of cache lines in a data cache, e.g., data cache 210b, in one of the processors, e.g., processor 10b, identified in step 303. For example, the program may select cache line A out of the plurality of cache lines A, B and C. In step 305, a determination is made as to whether the program has identified a load memory instruction executed after the memory barrier instruction selected in step 302, e.g., MB 1, in the cache line selected in step 304, e.g., cache line A. Referring to FIG. 4, if the memory barrier instruction selected in step 302 was MB1 and the cache line selected in step 304 was cache line A, then the program would identify load memory instruction L8. If the program had not been able to identify a load memory instruction executed after the memory barrier instruction selected in step 302 in the cache line selected in step 304, then a determination is made in step 303 as to whether the program has identified a cache line not previously identified in step 303. For example, if the program selected cache line A out of the plurality of cache lines A, B and C in the first loop, the program may select cache line B.

If in step 305, the program was able to identify a load memory instruction executed after the memory barrier instruction selected in step 302 in the cache line selected in step 304, then a determination is then made by the program in step 306 as to whether there are other cache lines not previously selected to be paired with the cache line selected in step 304. If there are not other cache lines not previously selected to be paired with the cache line selected in step 304, then a determination is made in step 303 as to whether the program has identified a cache line not previously identified in step 303. If, however, there are other cache lines not previously selected to be paired with the cache line selected in step 304, then one of the remaining cache lines is selected, e.g., cache line B, in step 307. (In a later loop, the program may, for example, select cache line C to be paired with cache line A.) In step 308, a determination is made as to whether the program has identified a load memory instruction executed before the memory barrier instruction selected in step 302, e.g., MB1, in the cache line selected in step 307, e.g., cache line B. Referring to FIG. 4, if the memory barrier instruction selected in step 302 was MB1 and the cache line selected in step 307 was cache line B, then the program would identify load memory instruction L4. A pair of load memory instructions has then been identified. That is, load memory instruction L8 of cache line A and load memory instruction L4 of cache line B has been identified as a pair of load memory instructions. As stated above, in a later loop, the program may select cache line C to be paired with cache line A. Subsequently, a new pair of load memory instructions would be identified. That is, load memory instruction L8 of cache line A and load memory instruction L7 of cache line C would be identified as another pair of load memory instructions. If the program had not been able to identify a load memory instruction executed before the memory barrier instruction selected in step 302 in the cache line selected in step 307, then a determination is made in step 306 as to whether there are other cache lines not previously selected to be paired with the cache line selected in step 304.

Referring to step 306, if there are no more cache lines to be paired with the cache line selected in step 304, then a determination is made in step 303 as to whether the program has identified a cache line not previously identified in step 303. Referring to the above example, cache line A was selected in step 301 and later paired with cache lines B and C in step 307 in the remaining loops of method 300. When all the cache lines have been paired with the cache line selected in step 304, e.g., cache line A, a new cache line is selected in step 303 that was not previously selected by step 303. Hence, the program may select cache line B in step 303. The program may then pair cache line B with the other remaining cache lines, i.e., cache lines A and C, in step 307 in the remaining loops of method 300. When all the cache lines of a particular processor have been identified in step 303, then a determination is made in step 301 as to whether the program has identified a memory barrier instruction not previously identified in step 301. Referring to the above example, memory barrier instruction, MB1, was selected in step 302 in the first loop. When all the cache lines of a particular processor have been identified in step 303, the program may select memory barrier instruction, MB2, in step 302 since the program identified a memory barrier instruction, e.g., MB2, not previously identified in step 301. When the program identifies all the memory barrier instructions issued by a particular processor, e.g., processor 10b, then method 300 terminates at step 313.

Referring to step 308, if the program was not able to identify a load memory instruction executed before the memory barrier instruction selected in step 302 in the cache line selected in step 307, then a determination is made in step 306 as to whether there are other cache lines not previously selected to be paired with the cache line selected in step 304.

Referring to step 308, if the program was able to identify a load memory instruction executed before the memory barrier instruction selected in step 302 in the cache line selected in step 307, then the program identifies the most recent reloads of the cache lines of each of the load memory instructions previously identified, i.e., load memory instruction identified in step 305 and load memory instruction identified in step 308, in step 309. A reload may be a system bus transaction traced by system bus tracer 231 that causes a cache line of a particular cache of a particular processor to be updated.

A determination is then made in step 310 if the reload of the cache line, i.e., cache line identified in step 304, of the load memory instruction identified in step 305 occurs after the reload of the cache line, i.e., cache line identified in step 307, of the load memory instruction identified in step 308. By determining whether or not the reload of the cache line identified in step 304 occurred after the reload of the cache line identified in step 307, a determination may be made as to whether the data loaded by the load memory instruction identified in step 305 was stored prior to the data loaded by the load memory instruction identified in step 308 without having to explicitly read the data or make pair-wise comparisons of the loads and stores on each side of each memory barrier instruction. If the reload of the cache line selected in step 304 of the load memory instruction identified in step 305 occurred after the reload of the cache line identified in step 307 of the load memory instruction identified in step 308, then the data loaded by the execution of the load memory instruction identified in step 305 is more recent than the data loaded by the execution of the load memory instruction identified in step 308. If the reload of the cache line selected in step 304 of the load memory instruction identified in step 305 did not occur after the reload of the cache line identified in step 307 of the load memory instruction identified in step 308, then the data loaded by the execution of the load memory instruction identified in step 308 is more recent than the data loaded by the execution of the load memory instruction identified in step 305.

If the reload of the cache line selected in step 304 of the load memory instruction identified in step 305 occurred after the reload of the cache line identified in step 307 of the load memory instruction identified in step 308, then based on the assumptions that any subsequent load memory instructions executed by the processor, e.g., processor 10b, will not load data older than the data previously read and that the data read by a read issued by a processor, e.g., processor 10b, is the same data as that stored by the store memory instruction previously executed by the processor, e.g., processor 10a, the following may be inferred: (1) the data loaded by the execution of the load memory instruction before the memory barrier instruction by a processor, processor 10b, is the same data as that was stored by the execution of the store memory instruction after the memory barrier instruction by the other processor, e.g., processor 10a, and (2) the data loaded by the execution of the load memory instruction after the memory barrier instruction by a processor, processor 10b, is the same data as that was stored by the execution of the store memory instruction before the memory barrier instruction by the other processor, e.g., processor 10a. Subsequently, cumulative ordering has not been violated.

Referring to step 310, if the reload of the cache line selected in step 304 of the load memory instruction identified in step 305 occurred after the reload of the cache line identified in step 307 of the load memory instruction identified in step 308, then a determination is made in step 306 as to whether there are other cache lines not previously selected to be paired with the cache line selected in step 304.

If in step 310, the reload of the cache line identified in step 304 of the load memory instruction identified in step 305 did not occur after the reload of the cache line identified in step 307 of the load memory instruction identified in step 308, then a determination is then made in step 311 as to whether the ownership transaction referencing the cache line identified in step 303 was initiated by the processor, e.g., processor 10a, at a time between the most recent reloads identified in step 309. The ownership transaction may refer to a processor, e.g., processor 10a, procuring control of a cache line to write data to that particular cache line upon obtaining permission from other devices, e.g., processor 10b, in the multiprocessor data processing system 13. If the ownership transaction was initiated by the processor, e.g., processor 10a, at a time between the most recent reloads identified in step 309, then a potential violation of cumulative ordering has been identified in step 312. As stated above, if the reload of cache line selected in step 304 did not occur after the reload of the cache line identified in step 307, then the data loaded by the execution of the load memory instruction identified in step 308 is more recent than the data loaded by the execution of the load memory instruction identified in step 305. By a processor, e.g., processor 10a, initiating an ownership transaction between the most recent reloads where the reload of the cache line selected in step 304 did not occur after the reload of the cache line identified in step 307, the processor, e.g., processor 10b, may not be loading the most recent data. Thus, a potential violation of cumulative ordering may be identified without verifying that the data loaded from execution of a load memory instruction before/after the memory barrier instruction in one processor is the same data that was stored from the execution of a store memory instruction after/before the memory barrier instruction in another processor.

If the ownership transaction was not initiated by the processor, e.g., processor 10a, at a time between the most recent reloads identified in step 309, then a determination is made in step 306 as to whether there are other cache lines not previously selected to be paired with the cache line selected in step 304 in this loop.

It is noted that the entire multiprocessor system 13 may be verified for cumulative ordering by implementing method 300 for each processor, e.g., 10a, 10b, in multiprocessor system 13. It is further noted that the program of the present invention may reside in disk unit 20 or application 42. It is further noted that the program of the present invention may be implemented as part of the verification program as described in FIG. 2 where the verification program resides in disk unit 20 or application 42.

Although the method, computer program product and data processing system of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for verifying cumulative ordering comprising the steps of:
    selecting a first memory barrier instruction;
    selecting a first cache line out of a plurality of cache lines;
    determining whether a first load memory instruction executed after said first memory barrier instruction in said first cache line has been identified;
    pairing said first cache line with a second cache line if said first load memory instruction has been identified, wherein said second cache line is a remaining cache line of said plurality of cache lines;
    determining whether a second load memory instruction executed before said first memory barrier instruction in said second cache line has been identified; and
    identifying a first and a second reload of said first and said second cache line if said second load memory instruction has been identified, wherein a first pair of load memory instructions is identified, wherein said first pair of load memory instructions comprises said first load memory instruction and said second load memory instruction.

2. The method as recited in claim 1 further comprising the step of:
    determining whether said first reload occurred after said second reload.

3. The method as recited in claim 2, wherein if said first reload did not occur after said second reload, then the method further comprises the step of:
    determining whether an ownership transaction referencing said first cache line was initiated at a time between said first and said second reload;
    wherein if said ownership transaction was initiated at said time between said first and second reload, then a potential violation of cumulative ordering has occurred.

4. The method as recited in claim 3, wherein if said ownership transaction was not initiated at said time between said first and second reload, then the method further comprises the step of:
    determining whether there are other remaining caches lines that have not been paired with said first cache line.

5. The method as recited in claim 2, wherein if said first reload occurred after said second reload, then the method further comprises the step of:
    determining whether there are other remaining caches lines that have not been paired with said first cache line.

6. The method as recited in claim 5, wherein if there are other cache lines not previously paired with said first cache line, then the method further comprises the steps of:
    selecting a third cache line to be paired with said first cache line;
    determining whether a third load memory instruction executed before said first memory barrier instruction in said third cache line has been identified, wherein if said third load memory instruction has been identified, then a second pair of load memory instructions is identified, wherein said second pair of load memory instructions comprises said first load memory instruction and said third load memory instruction.

7. The method as recited in claim 6 further comprising the step of:
identifying said first and a third reload associated with said first and said third cache line.

8. The method as recited in claim 7 further comprising the step of:
determining whether said first reload occurred after said third reload.

9. The method as recited in claim 8, wherein if said first reload occurred after said third reload, then the method further comprises the step of:
determining whether there are other remaining caches lines that have not been paired with said first cache line.

10. The method as recited in claim 8, wherein if said first reload did not occur after said third reload, then the method further comprises the step of:
determining whether said ownership transaction referencing said first cache line was initiated at a time between said first and said third reload.

11. The method as recited in claim 5, wherein if there are no other remaining cache lines that have not been paired with said first cache line, then the method further comprises the step of: determining whether there are any other cache lines to be selected to be paired with the other remaining cache lines.

12. The method as recited in claim 11, wherein if there are other cache lines to be selected to be paired with the other remaining cache lines, then the method further comprises the steps of:
selecting said second cache line out of said plurality of cache lines to be paired with the remaining of said plurality of cache lines; and
determining whether a third load memory instruction executed after said first memory barrier instruction in said second cache line has been identified.

13. The method as recited in claim 12, wherein if said third load memory instruction has not been identified, then the method further comprises the step of:
determining whether there are any other cache lines to be selected to be paired with the other remaining cache lines.

14. The method as recited in claim 12, wherein if said third load memory instruction has been identified, then the method further comprises the step of:
determining whether there are other remaining caches lines that have not been paired with said second cache line.

15. The method as recited in claim 14, wherein if there are other cache lines not previously paired with said second cache line, then the method further comprises the steps of:
selecting said first cache line to be paired with said second cache line; and
determining whether a fourth load memory instruction executed before said first memory baffler instruction in said first cache line has been identified, wherein if said fourth load memory instruction has been identified, then a second pair of load memory instructions is identified, wherein said second pair of load memory instructions comprises said third load memory instruction and said fourth load memory instruction.

16. The method as recited in claim 14, wherein if there are no other cache lines not previously paired with said second cache line, then the method further comprises the steps of:
determining whether there are any other cache lines to be selected to be paired with the other remaining cache lines.

17. The method as recited in claim 16, wherein if there are no other cache lines to be selected to be paired with the other remaining cache lines, then the method further comprises the step of:
determining whether there is at least one memory barrier instruction not previously identified.

18. The method as recited in claim 17, wherein if there is at least one memory barrier instruction not previously identified, then the method further comprises the steps of:
selecting a second memory barrier instruction; and
determining whether there are any other cache lines to be selected to be paired with the other remaining cache lines.

19. The method as recited in claim 11, wherein if there are no other cache lines to be selected to be paired with the other remaining cache lines, then the method further comprises the step of:
determining whether there is at least one memory baffler instruction not previously identified.

20. The method as recited in claim 19, wherein if there is at least one memory baffler instruction not previously identified, then the method further comprises the steps of:
selecting a second memory baffler instruction; and
determining whether there are any other cache lines to be selected to be paired with the other remaining cache lines.

21. The method as recited in claim 1, wherein if said second load memory instruction has not been identified, then the method further comprises the step of:
determining whether there are other remaining caches lines that have not been paired with said first cache line.

22. A computer program product having a computer readable medium having computer program logic recorded thereon for verifying cumulative ordering, comprising:
programming operable for selecting a first memory barrier instruction;
programming operable for selecting a first cache line out of a plurality of cache lines;
programming operable for determining whether a first load memory instruction executed after said first memory barrier instruction in said first cache line has been identified;
programming operable for pairing said first cache line with a second cache line if said first load memory instruction has been identified, wherein said second cache line is a remaining cache line of said plurality of cache lines;
programming operable for determining whether a second load memory instruction executed before said first memory barrier instruction in said second cache line has been identified; and
programming operable for identifying a first and a second reload of said first and said second cache line if said second load memory instruction has been identified, wherein a first pair of load memory instructions is identified, wherein said first pair of load memory instructions comprises said first load memory instruction and said second load memory instruction.

23. The computer program product as recited in claim 22 further comprises:
programming operable for determining whether said first reload occurred after said second reload.

24. The computer program product as recited in claim 23, wherein if said first reload did not occur after said second reload, then the computer program product further comprises:

programming operable for determining whether an ownership transaction referencing said first cache line was initiated at a time between said first and said second reload;

wherein if said ownership transaction was initiated at said time between said first and second reload, then a potential violation of cumulative ordering has occurred.

25. The computer program product as recited in claim 24, wherein if said ownership transaction was not initiated at said time between said first and second reload, then the computer program product further comprises:

programming operable for determining whether there are other remaining caches lines that have not been paired with said first cache line.

26. The computer program product as recited in claim 23, wherein if said first reload occurred after said second reload, then the computer program product further comprises:

programming operable for determining whether there are other remaining caches lines that have not been paired with said first cache line.

27. The computer program product as recited in claim 26, wherein if there are other cache lines not previously paired with said first cache line, then the computer program product further comprises:

programming operable for selecting a third cache line to be paired with said first cache line;

programming operable for determining whether a third load memory instruction executed before said first memory barrier instruction in said third cache line has been identified, wherein if said third load memory instruction has been identified, then a second pair of load memory instructions is identified, wherein said second pair of load memory instructions comprises said first load memory instruction and said third load memory instruction.

28. The computer program product as recited in claim 27 further comprises:

programming operable for identifying said first and a third reload associated with said first and said third cache line.

29. The computer program product as recited in claim 28 further comprises:

programming operable for determining whether said first reload occurred after said third reload.

30. The computer program product as recited in claim 29, wherein if said first reload occurred after said third reload, then the computer program product further comprises:

programming operable for determining whether there are other remaining caches lines that have not been paired with said first cache line.

31. The computer program product as recited in claim 29, wherein if said first reload did not occur after said third reload, then the computer program product further comprises:

programming operable for determining whether said ownership transaction referencing said first cache line was initiated at a time between said first and said third reload.

32. The computer program product as recited in claim 26, wherein if there are no other remaining cache lines that have not been paired with said first cache line, then the computer program product further comprises:

programming operable for determining whether there are any other cache lines to be selected to be paired with the other remaining cache lines.

33. The computer program product as recited in claim 32, wherein if there are other cache lines to be selected to be paired with the other remaining cache lines, then the computer program product further comprises:

programming operable for selecting said second cache line out of said plurality of cache lines to be paired with the remaining of said plurality of cache lines; and programming operable for determining whether a third load memory instruction executed after said first memory barrier instruction in said second cache line has been identified.

34. The computer program product as recited in claim 33, wherein if said third load memory instruction has not been identified, then the computer program product further comprises:

programming operable for determining whether there are any other cache lines to be selected to be paired with the other remaining cache lines.

35. The computer program product as recited in claim 33, wherein if said third load memory instruction has been identified, then the computer program product further comprises:

programming operable for determining whether there are other remaining caches lines that have not been paired with said second cache line.

36. The computer program product as recited in claim 35, wherein if there are other cache lines not previously paired with said second cache line, then the computer program product further comprises:

programming operable for selecting said first cache line to be paired with said second cache line; and programming operable for determining whether a fourth load memory instruction executed before said first memory barrier instruction in said first cache line has been identified, wherein if said fourth load memory instruction has been identified, then a second pair of load memory instructions is identified, wherein said second pair of load memory instructions comprises said third load memory instruction and said fourth load memory instruction.

37. The computer program product as recited in claim 35, wherein if there are no other cache lines not previously paired with said second cache line, then the computer program product further comprises:

programming operable for determining whether there are any other cache lines to be selected to be paired with the other remaining cache lines.

38. The computer program product as recited in claim 37, wherein if there are no other cache lines to be selected to be paired with the other remaining cache lines, then the computer program product further comprises:

programming operable for determining whether there is at least one memory barrier instruction not previously identified.

39. The computer program product as recited in claim 38, wherein if there is at least one memory barrier instruction not previously identified, then the computer program product further comprises:

programming operable for selecting a second memory barrier instruction; and programming operable for determining whether there are any other cache lines to be selected to be paired with the other remaining cache lines.

40. The computer program product as recited in claim 32, wherein if there are no other cache lines to be selected to be paired with the other remaining cache lines, then the computer program product further comprises:

programming operable for determining whether there is at least one memory barrier instruction not previously identified.

41. The computer program product as recited in claim 40, wherein if there is at least one memory barrier instruction not previously identified, then the computer program product further comprises:

programming operable for selecting a second memory barrier instruction; and programming operable for determining whether there are any other cache lines to be selected to be paired with the other remaining cache lines.

42. The computer program product as recited in claim 22, wherein if said second load memory instruction has not been identified, then the computer program product further comprises:

programming operable for determining whether there are other remaining caches lines that have not been paired with said first cache line.

43. A data processing system, comprising:

a processor;

a memory unit operable for storing a computer program operable for verifying cumulative ordering;

an input mechanism;

an output mechanism;

a bus system coupling the processor to the memory unit, input mechanism, and output mechanism, wherein the computer program is operable for performing the following programming steps:

selecting a first memory baffler instruction;

selecting a first cache line out of a plurality of cache lines;

determining whether a first load memory instruction executed after said first memory baffler instruction in said first cache line has been identified;

pairing said first cache line with a second cache line if said first load memory instruction has been identified, wherein said second cache line is a remaining cache line of said plurality of cache lines;

determining whether a second load memory instruction executed before said first memory baffler instruction in said second cache line has been identified; and identifying a first and a second reload of said first and said second cache line if said second load memory instruction has been identified, wherein a first pair of load memory instructions is identified, wherein said first pair of load memory instructions comprises said first load memory instruction and said second load memory instruction.

44. The data processing system as recited in claim 43, wherein the computer program is further operable to perform the programming step:

determining whether said first reload occurred after said second reload.

45. The data processing system as recited in claim 44, wherein if said first reload did not occur after said second reload, then the computer program is further operable to perform the programming step:

determining whether an ownership transaction referencing said first cache line was initiated at a time between said first and said second reload;

wherein if said ownership transaction was initiated at said time between said first and second reload, then a potential violation of cumulative ordering has occurred.

46. The data processing system as recited in claim 45, wherein if said ownership transaction was not initiated at said time between said first and second reload, then the computer program is further operable to perform the programming step:

determining whether there are other remaining caches lines that have not been paired with said first cache line.

47. The data processing system as recited in claim 44, wherein if said first reload occurred after said second reload, then the computer program is further operable to perform the programming step:

determining whether there are other remaining caches lines that have not been paired with said first cache line.

48. The data processing system as recited in claim 44, wherein if there are other cache lines not previously paired with said first cache line, then the computer program is further operable to perform the programming steps:

selecting a third cache line to be paired with said first cache line;

determining whether a third load memory instruction executed before said first memory barrier instruction in said third cache line has been identified, wherein if said third load memory instruction has been identified, then a second pair of load memory instructions is identified, wherein said second pair of load memory instructions comprises said first load memory instruction and said third load memory instruction.

49. The data processing system as recited in claim 48, wherein the computer program is further operable to perform the programming step:

identifying said first and a third reload associated with said first and said third cache line.

50. The data processing system as recited in claim 49, wherein the computer program is further operable to perform the programming step:

determining whether said first reload occurred after said third reload.

51. The data processing system as recited in claim 50, wherein if said first reload occurred after said third reload, then the computer program is further operable to perform the programming step:

determining whether there are other remaining caches lines that have not been paired with said first cache line.

52. The data processing system as recited in claim 50, wherein if said first reload did not occur after said third reload, then the computer program is further operable to perform the programming step:

determining whether said ownership transaction referencing said first cache line was initiated at a time between said first and said third reload.

53. The data processing system as recited in claim 47, wherein if there are no other remaining cache lines that have not been paired with said first cache line, then the computer program is further operable to perform the programming step:

determining whether there are any other cache lines to be selected to be paired with the other remaining cache lines.

54. The data processing system as recited in claim 53, wherein if there are other cache lines to be selected to be paired with the other remaining cache lines, then the computer program is further operable to perform the programming steps:

selecting said second cache line out of said plurality of cache lines to be paired with the remaining of said plurality of cache lines; and determining whether a third load memory instruction executed after said first memory barrier instruction in said second cache line has been identified.

55. The data processing system as recited in claim 54, wherein if said third load memory instruction has not been identified, then the computer program is further operable to perform the programming step:

determining whether there are any other cache lines to be selected to be paired with the other remaining cache lines.

56. The data processing system as recited in claim 54, wherein if said third load memory instruction has been identified, then the computer program is further operable to perform the programming step:

determining whether there are other remaining caches lines that have not been paired with said second cache line.

57. The data processing system as recited in claim 56, wherein if there are other cache lines not previously paired with said second cache line, then the computer program is further operable to perform the programming steps:

selecting said first cache line to be paired with said second cache line; and determining whether a fourth load memory instruction executed before said first memory barrier instruction in said first cache line has been identified, wherein if said fourth load memory instruction has been identified, then a second pair of load memory instructions is identified, wherein said second pair of load memory instructions comprises said third load memory instruction and said fourth load memory instruction.

58. The data processing system as recited in claim 56, wherein if there are no other cache lines not previously paired with said second cache line, then the computer program is further operable to perform the programming step:

determining whether there are any other cache lines to be selected to be paired with the other remaining cache lines.

59. The data processing system as recited in claim 58, wherein if there are no other cache lines to be selected to be paired with the other remaining cache lines, then the computer program is further operable to perform the programming step:

determining whether there is at least one memory baffler instruction not previously identified.

60. The data processing system as recited in claim 59, wherein if there is at least one memory baffler instruction not previously identified, then the computer program is further operable to perform the programming steps:

selecting a second memory baffler instruction; and determining whether there are any other cache lines to be selected to be paired with the other remaining cache lines.

61. The data processing system as recited in claim 53, wherein if there are no other cache lines to be selected to be paired with the other remaining cache lines, then the computer program is further operable to perform the programming step:

determining whether there is at least one memory barrier instruction not previously identified.

62. The data processing system as recited in claim 61, wherein if there is at least one memory barrier instruction not previously identified, then the computer program is further operable to perform the programming steps:

selecting a second memory baffler instruction; and determining whether there are any other cache lines to be selected to be paired with the other remaining cache lines.

63. The data processing system as recited in claim 43, wherein if said second load memory instruction has not been identified, then the computer program is further operable to perform the programming step:

determining whether there are other remaining caches lines that have not been paired with said first cache line.

* * * * *

UNITED STATES PATENT AND TRADEMARK OFFICE
CERTIFICATE OF CORRECTION

PATENT NO. : 6,795,878 B2
DATED : September 21, 2004
INVENTOR(S) : Aaron Ches Brown et al It is certified that error appears in the above-identified patent and that said Letters Patent is hereby corrected as shown below:

Column 5,
Line 37, following "bus" please insert "." and a new paragraph.

Column 15,
Line 54, please replace "baffler" the with -- barrier --.

Column 16,
Lines 18, 21 and 23, please replace "baffler" with -- barrier --.

Column 19,
Lines 32, 36 and 43, please replace "baffler" with -- barrier --.

Column 22,
Lines 6, 9, 12 and 27, please replace "baffler" with -- barrier --.

Signed and Sealed this

Third Day of May, 2005

JON W. DUDAS
*Director of the United States Patent and Trademark Office*